Figure 1:
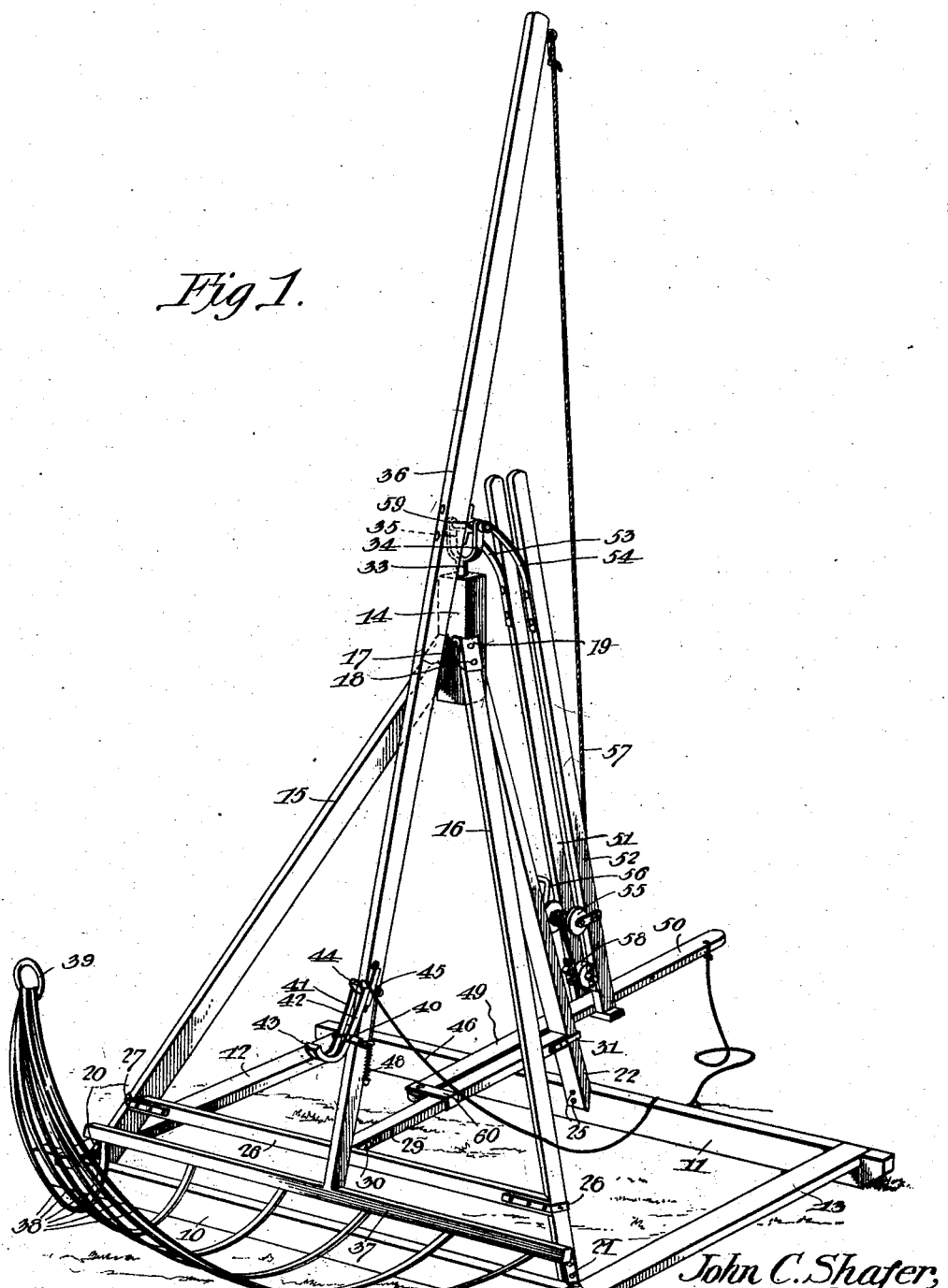

No. 755,057. PATENTED MAR. 22, 1904.
J. C. SHAFER.
HAY STACKER.
APPLICATION FILED APR. 3, 1903.
NO MODEL. 2 SHEETS—SHEET 1.

Witnesses
E. F. Stewart
R. N. Woodward

John C. Shafer,
Inventor.
by C. A. Snow & Co.
Attorneys

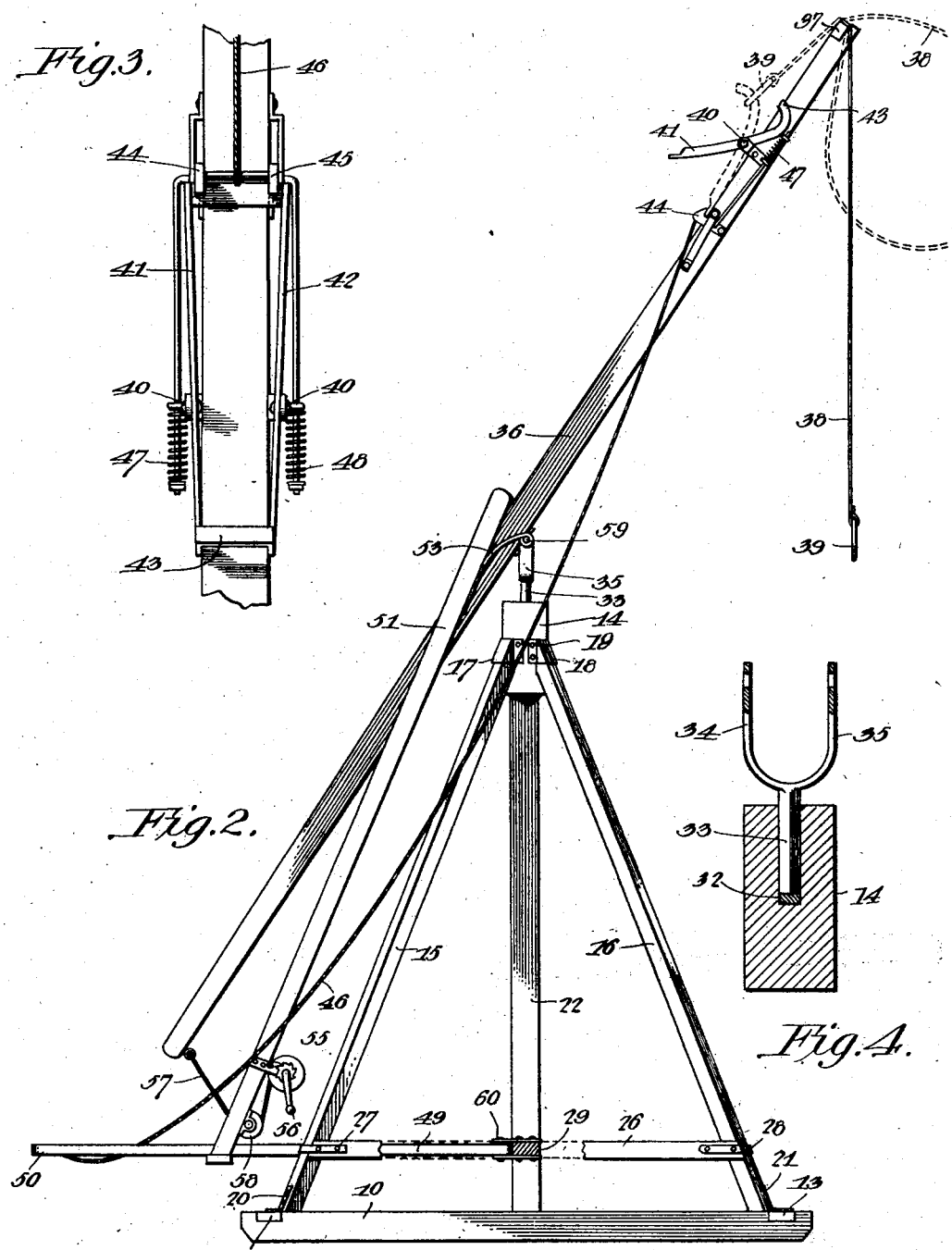

No. 755,057. Patented March 22, 1904.

UNITED STATES PATENT OFFICE.

JOHN C. SHAFER, OF EDINA, MISSOURI, ASSIGNOR OF ONE-HALF TO O. D. JONES, OF EDINA, MISSOURI.

HAY-STACKER.

SPECIFICATION forming part of Letters Patent No. 755,057, dated March 22, 1904.

Application filed April 3, 1903. Serial No. 150,954. (No model.)

*To all whom it may concern:*

Be it known that I, JOHN C. SHAFER, a citizen of the United States, residing at Edina, in the county of Knox and State of Missouri, have invented a new and useful Hay-Stacker, of which the following is a specification.

This invention relates to apparatus employed for handling hay and similar products in stacking, loading, or unloading wagons, cars, and other vehicles, and has for its object to simplify and improve devices of this character and to produce a compact, durable, and effective apparatus which may be readily transported from place to place and operated by power or manually; and the invention consists in certain novel features of the construction, as hereinafter shown and described, and specified in the claims.

In the drawings illustrative of the invention, in which corresponding parts are denoted by like designating characters, Figure 1 is a perspective view of the device with the boom lowered, and Fig. 2 is a front elevation with the boom elevated. Fig. 3 is an enlarged detail of the tripping mechanism. Fig. 4 is an enlarged sectional detail of the boom-support and swivel-standard.

The improved device consists of a base-frame formed of spaced side members 10 11, connected by transverse end members 12 13, the side members curved at their ends to transform them into "runners" to enable the device to be readily drawn over the ground.

Located centrally above the base-frame is a vertical member 14, having recesses in its opposite corners in which the upper "scarfed" ends of inclined brace members 15 16 are caused to fit, and held in place by metal clamp-plates 17 18, securely bolted, as at 19, to the central member and brace members, as shown. The lower diverging ends of the brace members are connected to the transverse members 12 13 by "clips" or clamp-plates 20 21, as shown. A third brace member 22 is connected by its upper scarfed end to the opposite side of the vertical member 14 by a clamp-plate and bolts, while its lower end is secured centrally to the "runner" 11 by bolts 25, as shown. By this simple means a "tripod-like" frame is formed, which firmly and securely supports the member 14 in a vertical position.

The members 15 16 are connected near their lower end by a horizontal tie member 26, with clips 27 28, and the brace member 22 is connected to the member 26 by a strut 29, with clips 30 31, as shown. The supporting-frame is thus greatly strengthened and stiffened and enabled to successfully resist the strains to which it will be subjected.

The vertical supporting member 14 is provided with a vertical aperture, in the bottom of which a wear-plate 32, preferably of steel, is placed, the aperture forming a support for a standard 33, having spaced arms 34 35, transversely perforated and forming the bearings for the transverse pivot 59 of the boom 36, as shown. By this means it will be obvious that the boom can be swung vertically upon its pivot and at the same time rotated with the standard in its seat in the member 14.

At one end the boom 36 is provided with a transverse arm 37, to which the spaced members 38 of the "sling" by which the load is supported are connected, the members 38 being united at their other ends to a ring or endless band 39, preferably of leather or other similar material.

Pivotally connected intermediately of their ends to the opposite sides of the boom near the cross-bar 37, as by a pivot-bolt 40, are curved bars 41 42, connected together at one end by plate 43 and with their other ends adapted to engage spring-supported catches 44 45, the catches provided with an operating-cord 46. The catches are held normally in yieldable engagement with the bars 41 42 by springs 47 48, as shown.

The end 43 of the trip-bars serves when in the position shown by dotted lines in Fig. 2 to hold the ring 39 and retain the load held by the sling intact; but it will be obvious that by disengaging the catches 44 and 45 by pulling the cord 46 the sling will be thereby released and the load "dumped."

Movably connected, as by a clip 60, to the strut 29 is a movable frame comprising a lever-arm 49, extending laterally over the base-frame and terminating in a handle 50 and having connected to the opposite sides thereof at an intermediate point spaced bars 51 52, which extend upwardly and are provided with brackets 53 54, connected to the outer ends of the boom-pivot 59, as shown.

The upper ends of the members 51 52 are adapted to receive the boom 36 between them when the latter is depressed, as shown in Fig. 2, and thus serve as lateral supports to the boom and assist the standard in its work, relieving it from a portion of the strains. By this arrangement it will be understood that the lateral movement of the lever-arm 49 will cause the standard 33 and boom 36 to be rotated upon the supporting-frame to dispose the load carried by the boom at any desired point.

The device may be of any desired size and capacity; but for ordinary purposes the base portion will be about ten feet long and about the same width, the member 14 about fourteen feet above the base, and the boom about twenty-four feet long; but these dimensions may be varied to any desired extent, and I do not, therefore, wish to be limited in any manner by the dimensions above stated. The members forming the supporting-framework and the boom will preferably be of wood of suitable strength, but may be of metal or a compound of wood and metal, as may be found desirable.

A windlass 55, mounted for rotation upon the bars 51 52 and provided with an operating-handle 56, is adapted to receive the draft-cable, represented at 57 and leading from the free end of the boom 36, by which means power may be imparted operatively to the boom. The bars 51 52 will also be provided with a guide-pulley 58, over which the cable 57 leads on its way to the windlass, and when the power is applied at a distance, as when horse, engine, or other relatively distant power is employed, the cable will be conducted to the source of power over the guide-pulley. By this simple means a very cheaply-constructed, compact, and durable hoisting device is produced which is capable of a wide range of uses, but, as before stated, is more particularly applicable for use in handling hay and similar products in stacking and loading or unloading and will be found very convenient for this purpose.

Having thus described the invention, what I claim is—

1. In a device of the class described, a supporting-frame, a vertical boom-support carried by said frame, a swivel-standard carried by said boom-support, a boom carried by said standard and vertically movable therein, a load-support carried by one end and an operating-cable carried by the other end of said boom, a laterally-extended frame movably connected at one end with said swivel-standard and at the other end with the supporting-frame, means for actuating said laterally-extended frame to cause the rotation of said boom, and cable-guiding means carried by said movable frame, substantially as described.

2. In a device of the class described, a supporting-frame, a vertical boom-support carried by said frame, a swivel-standard carried by said boom-support, a boom carried by said standard and vertically movable therein, a load-support carried by one end and an operating-cable carried by the other end of said boom, a movable frame formed with spaced supports connected with said standard by one end and with the supporting-frame at their other ends and adapted to receive the boom between them when said boom is operated, means for actuating said movable frame, and cable-guiding means carried by said spaced supports, substantially as described.

3. In a device of the class described, a supporting-frame, a vertical boom-support carried by said frame, a swivel-standard carried by said boom-support, a boom carried by said standard and vertically movable therein, a load-support carried by one end and an operating-cable carried by the other end of said boom, a movable frame having spaced supports connected with said standard at one end and with a supporting lever-arm leading from their other ends, said arm being pivotally attached to the supporting-frame in vertical alinement with said standard, and cable-guiding means carried by said movable frame, substantially as described.

4. In a device of the class described, a supporting-frame, a vertical boom-support carried by said frame, a swivel-standard carried by said boom-support, a boom carried by said standard and vertically movable therein, a load-support carried by one end and an operating-cable carried by the other end of said boom, a movable frame formed with spaced supports having laterally-extended brackets at one end secured to said standard, said supports being connected at their other ends with said supporting-frame, said spaced supports being adapted to receive the boom between their upper ends when said boom is actuated, means for actuating said movable frame, and cable-guiding means carried by said spaced supports, substantially as described.

5. In a device of the class described, a supporting-frame, a vertical central boom-support, inclined bars between said central support and the extremities of the frame, a standard mounted for rotation upon said boom-support, a boom carried by said standard and vertically movable therein, a movable frame laterally extended and movably connected at one end with said standard and at the other to said inclined bar-supports, and cable-guiding means carried by said movable frame, substantially as described.

6. In a device of the class described, a supporting-frame, a vertical boom-support carried by said frame, a swivel-standard carried by said boom-support, a boom carried by said standard and vertically movable therein, and carrying a load-supporting sling at one end, a trip-hook carried by said boom and adapted to engage said sling, and a trip-catch yieldably engaging said trip-hook, and means under the control of the operator for releasing said trip-catch, substantially as described.

7. In a device of the class described, a base-frame, a vertical boom-support carried by said base-frame, a swivel-standard carried by said boom-support, a boom carried by said standard and vertically movable therein, and carrying a load-supporting sling at one end, a trip-hook intermediately pivoted upon said boom and adapted to engage said sling by one end, a trip-catch yieldably engaging the other end of said trip-hook, and means under the control of the operator for releasing said trip-catch, substantially as described.

8. In a device of the class described, a supporting-frame, a boom-support carried thereby, a vertically-movable boom mounted on said support, a load-support carried by one end of said boom and operating means by the other end thereof, a movable frame hingedly secured at one end to said supporting-frame and having spaced bars connected at their upper ends with said boom-support.

In testimony that I claim the foregoing as my own I have hereto affixed my signature in the presence of two witnesses.

JOHN C. SHAFER.

Witnesses:
O. D. JONES,
J. V. TYSON.